April 5, 1938.  C. D. PIERRE  2,112,927

DOUGH KNEADER

Filed Oct. 30, 1936

Claude D. Pierre
INVENTOR.

BY Cecil H. Wood
ATTORNEYS.

Patented Apr. 5, 1938

2,112,927

UNITED STATES PATENT OFFICE 2,112,927

DOUGH KNEADER

Claude D. Pierre, Fort Worth, Tex.

Application October 30, 1936, Serial No. 108,333

6 Claims. (Cl. 259—109)

This invention relates to mixing equipment for mixing and kneading dough in bakeries, or the like, and it has particular reference to apparatus for mixing and processing quantities of flour and other ingredients with liquid preparatory to baking bread, cakes, or pastries, and its principal object resides in the provision of a series of bars attached to arms radially disposed upon a central shaft within the mixing vat which roll and press the product in a manner simulating manual manipulation and in which is provided an eccentric roller, which, by reason of its peculiar form and attachment to the assembly, affords a wider range of operation of the device upon varying quantities of dough.

Another object of the invention resides in the provision of an eccentric roller which is capable of contacting the bottom of the mixing vat and engage the smallest quantity of the product yet capable of varying its position and downward pressure thereagainst as the density of the material increases thus affording a machine of maximum utilitarian application since a very small quantity of the product can be processed in a machine of maximum capacity.

Broadly, the invention seeks to comprehend the provision of apparatus in which a dough product can be thoroughly processed by bars on rollers which flex and yield, to a degree, and which work the material from a substantially dry state into a doughy consistency without overkneading the product, yet providing equipment in which the minimum as well as the maximum quantity of dough can be processed.

While the foregoing objects are paramount, other and lesser objects will become manifest as the description proceeds taken in connection with the appended drawing wherein.

It is highly desirable to afford equipment which can be utilized for the preparation of a small batch or quantity of dough as well as a large quantity to supply minimum requirements and thereby enable the operator of a large machine to use his equipment, which may be primarily designed for large quantities of the mix, for a small "fill in" supply or for a short run of the product. Such equipment will eliminate the necessity of providing more than one machine.

Accordingly, therefore, the invention comprises a mixing vat or receptacle 1 which is preferably provided with a substantially semi-circular bottom and which is mounted upon any suitable support. A central shaft 2 extends through the approximate center of the receptacle 1 and is journalled in each end thereof and is driven through the medium of a pinion or gear 3 attached to one end of the shaft 2, as illustrated in Figure 5.

Figure 5:
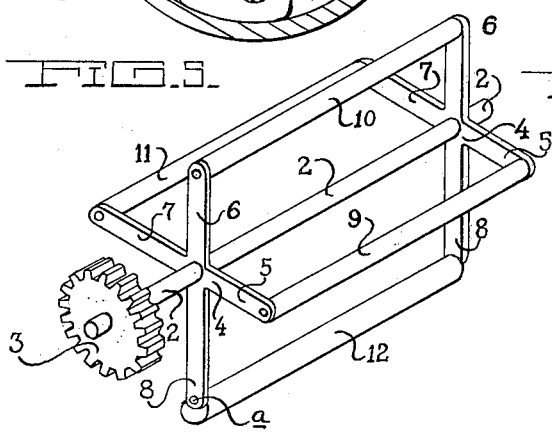
Figure 5 is a perspective view of the kneading apparatus.

Rigidly attached to the shaft 2, and near each end thereof, are spiders 4 whose arms 5, 6, 7 and 8 graduate in length and extend radially from the shaft 2 in the manner illustrated particularly in Figure 5. Each of the spiders 4, however, are arranged upon the shaft 2 in such a manner as to effect an alinement of the arms 5, 6, 7 and 8 and thus pair the same as to length.

Extending between the ends of each pair of the arms 5, 6 and 7 are rollers 9, 10 and 11 which are rotatably secured to the arms and whose function will presently become manifest. The longest of the arms 8 is not provided with a roller such as that above described but instead supports, for free rotation, an eccentrically pivoted roller 12.

Figure 1:
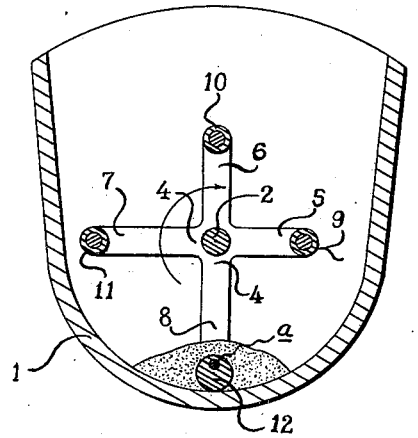
Figure 1 is a vertical cross-section of the dough mixing receptacle with the kneading apparatus shown in section and illustrating a quantity of dry ingredients about to be processed and engaged by the eccentric roller.

Thus, in operation, the ingredients are placed within the receptacle 1 in a dry state, as illustrated in Figure 1, and liquid is added to the material as desired. As the kneading apparatus, which consists of the arrangement shown in Figure 5, is rotated within the receptacle 1 the material gradually increases in consistency and it is operated upon in its primary state by the roller which, as has already been stated, is eccentrically mounted between the ends of the longest of the radial arms 8 and by reason of its eccentric mounting it is capable of assuming positions which vary the proximity of its rounded surface to that of the bottom of the receptacle 1.

Figure 3:
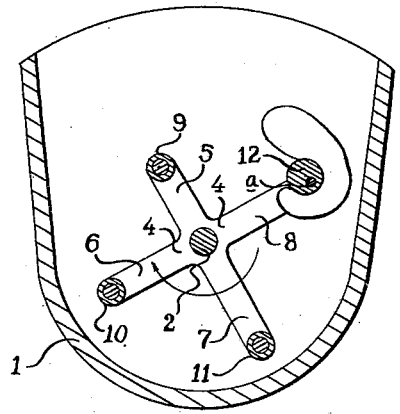
Figure 3 is a similar view showing the dough deposited on the side of the receptacle, preparatory to being pressed and rolled by one of the kneading rollers or bars.
Figure 2:
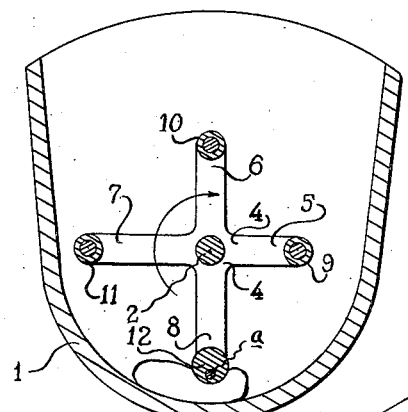
Figure 2 is a similar view showing the eccentric roller contacting a quantity of the material after several revolutions of the kneading apparatus and illustrating the eccentric movement of the said roller.
Figure 4:
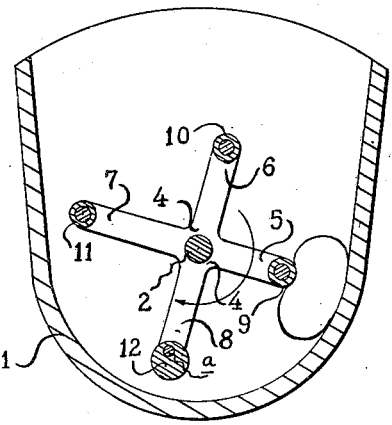
Figure 4 is a similar view showing the dough in one of the kneading operations.

Therefore, when the material is placed in the receptacle 1, as previously pointed out, the roller 12 is suspended in its lowermost position and may contact even a very small quantity of the dry ingredients in its movement over the bottom of the receptacle 1 and yield upwardly as the material increases in density and yet pressing or bearing against the product sufficiently to work the same in a manner simulating manual manipulation, the rollers 9, 10 and 11, assisting in kneading and working the product around the surface of the receptacle 1 in the manner illustrated in Figures 2, 3 and 4.

Obviously, when a device of the character described is provided with rollers 9, 10 and 11, whose axial planes cannot vary, no flexibility or variety in operation can be accomplished and therefore only predetermined quantities of the product can be processed thereby and such quantities as are ordinarily considered as the maximum, that is, only large batches of dough may be prepared at each operation. The principal object of the herein described invention is that of affording a machine of greater elasticity wherein smaller quantities of the product can be treated without necessitating the changing of any parts or in any manner altering the arrangement of parts. In other words, the axial arrangement of the rollers is automatically varied in operation as required.

It will be noted that, while the eccentric roller 12 is shown to be mounted between the longest of the arms 8 by means of pins a, but this element will be equally operable when the pivot pins are made integral with the roller 12. Special bearings may also be employed for supporting the roller 12 at its pivot points in the arms 8 when desired. It is not considered necessary, however, that any particular form of bearing be provided since only a small amount of friction would exist.

Figure 6:
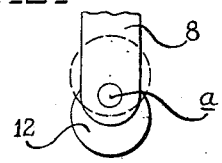
Figure 6 is a fragmentary elevational view of one of the spider arms and the eccentrically mounted roller, illustrating the latter in its uppermost position in dotted lines.

There is always a possibility of over-kneading or over-working the dough and thereby providing a mixture which is undesirable in its texture and the provision of the roller 12 and its peculiar adaptations to engage the surface of the product only to a certain degree, will process the mixture to the desired consistency without tearing or stretching the dough and thus producing a texture which is non-uniform and uneven. Each time the material is carried around the receptacle by the rollers 9, 10, and 11, as well as the roller 12, the mass becomes more dense and therefore the roller 12 is rotated on its eccentric pivots a gradually upwardly, as illustrated in Figures 2 and 6, the weight of the roller 12 bearing against the surface of the product sufficiently to depress the same, yet without forcing the material excessively.

Manifestly, each of the rollers 9, 10 and 11 may be designed according to the form and mounting of the roller 12 if it is considered desirable, so that each roller may operate an eccentric pivot, their surfaces graduating or varying in proximity to the surface of the receptacle 1 in the same manner as the roller 12 operates and which has already been described. Such an arrangement may be especially advantageous in the processing of materials of an unusual light consistency or of lighter consistency than the conventional mix required for bread, such, for example, as what is commonly known as a batter.

Although the invention has been described with great particularity, certain changes and modifications may be resorted to from time to time by those skilled in the art and such changes and modifications as may be considered within the spirit and intent of the invention may also be considered as falling within the scope of the appended claims.

What is claimed is:

1. In combination with a dough mixing machine having a receptacle and a central shaft longitudinally arranged through the said receptacle, a pair of multiple armed spiders affixed to the said shaft, rollers rotatively mounted in the said spiders, one of the said rollers having axially offset pivots in each end thereof and each of the said rollers arranged at varying degrees of proximity to the said central shaft.

2. In a dough mixing machine having a receptacle, the combination of an agitator mounted on a central longitudinal shaft within the said receptacle, spiders having radially disposed arms mounted upon the said shaft, each of the said arms graduating in length and having rollers rotatively mounted at their outer end, one of the said rollers having axially offset pivots on each end thereof for free rotation in its bearings.

3. In combination with a dough mixing machine, the combination of a receptacle having a semi-circular bottom, a rotatable kneading device having rollers and a pair of spiders each having radial arms, the said arms being graduated in length and supporting the said rollers, one pair of the said arms supporting a freely rotating eccentric roller having its pivots axially offset and journalled to the said arms.

4. In combination with a dough mixing machine having a receptacle and an agitator rotatably disposed within the said receptacle, the said agitator having a central shaft and a multiplicity of rollers graduating in distance from the said central shaft, one of the said rollers having axially offset pivots providing eccentric mountings therefor.

5. In combination with a dough mixing machine having a receptacle provided with a semi-circular bottom, a pair of spiders rotatably fixed to a central shaft extending through the said receptacle, the said spiders having radially extending arms of different lengths, rollers rotatably mounted between each pair of the said arms and one of the said rollers having axially offset pivots providing free rotation between the longest of the said arms.

6. In combination with a dough mixing machine having a receptacle, a central shaft extending through the said receptacle rotatably supporting a pair of spiders having radially extending arms, each graduating in length and having rollers rotatably mounted at their outer ends, one of the said rollers having axially offset pivots freely journalled within the ends of the longest of the said arms.

CLAUDE D. PIERRE.